Feb. 17, 1942.   J. LEDWINKA   2,273,053
TORSION SPRING SUSPENSION FOR RAILWAY TRUCKS
Filed Jan. 5, 1940   2 Sheets-Sheet 2
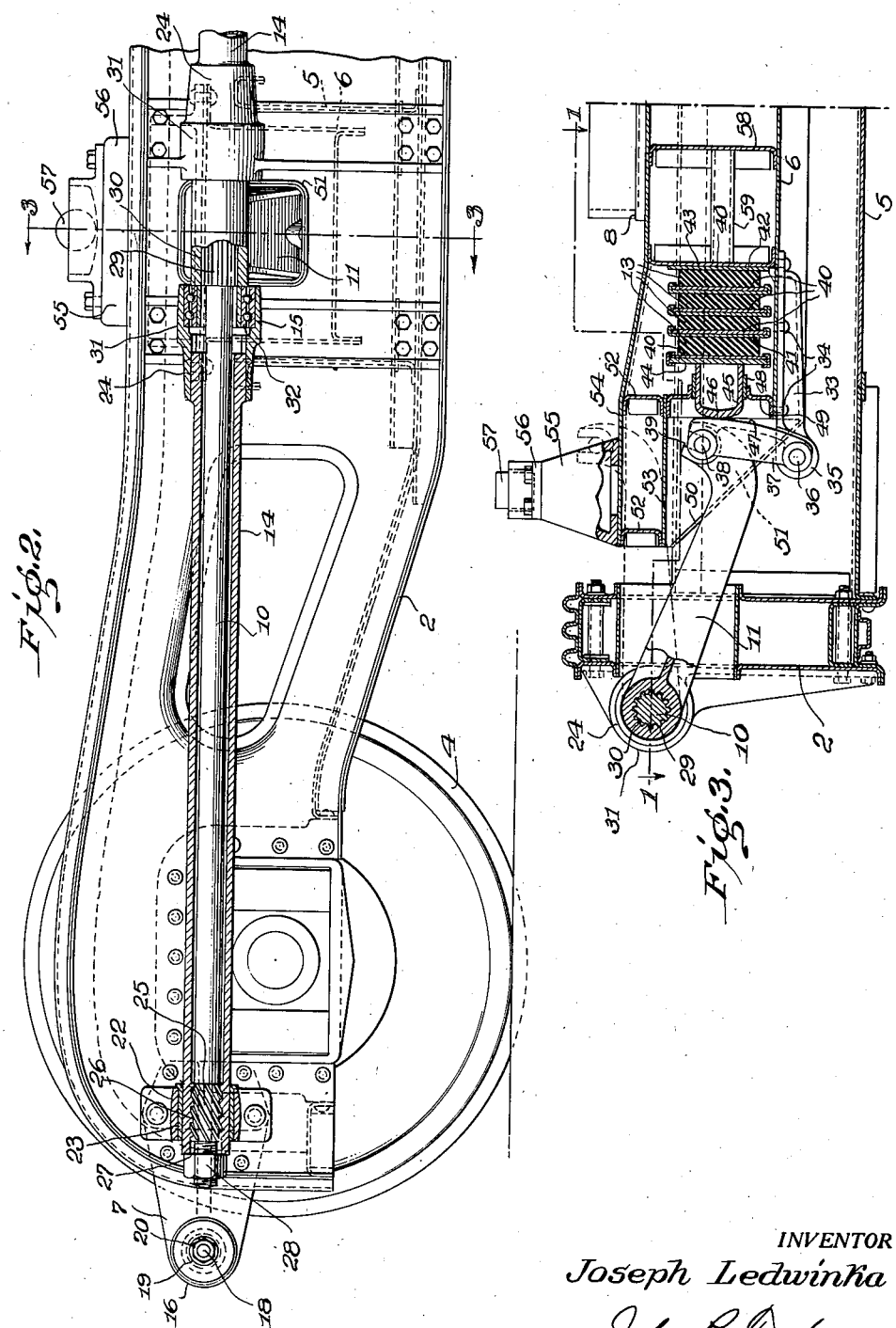
INVENTOR
Joseph Ledwinka
BY
ATTORNEY Patented Feb. 17, 1942

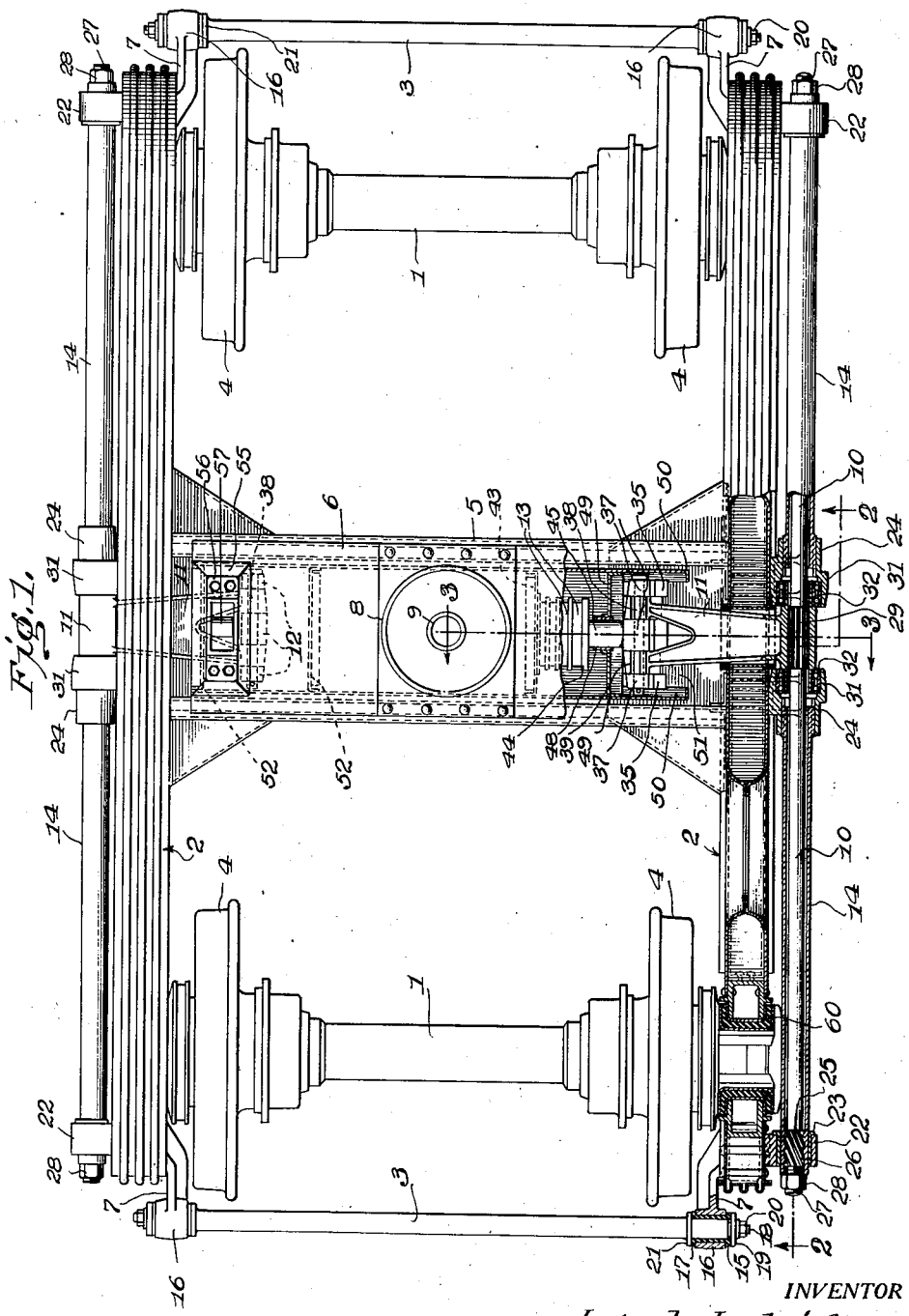

2,273,053

UNITED STATES PATENT OFFICE 2,273,053

TORSION SPRING SUSPENSION FOR RAILWAY TRUCKS

Joseph Ledwinka, Philadelphia, Pa., assignor to Edward G. Budd Manufacturing Company, Philadelphia, Pa., a corporation of Pennsylvania Application January 5, 1940, Serial No. 312,469

11 Claims. (Cl. 105—190)

The present invention relates to railway trucks.

More specifically it relates to trucks of built-up construction wherein a yieldable material such as rubber is employed in place of metal springs and wherein in addition to such yieldable material torsional rods and tubes are provided to afford a resilient support for the bolster.

An object of the invention is to increase the effectiveness of the torsion means by providing torsion rods concentrically within torsion tubes, the ends of the rods in one form being secured to certain ends of the tubes and the torsion being applied between the center of the rod and the other ends of the tubes respectively, whereby the same effect is attained as would correspond to a rod or tube alone of double the length, but secured at its ends to the truck with the torsion applied at the center point.

Another object is to provide a light weight compact truck having a pleasing streamline appearance.

Other objects and advantages will be understood from the following specification in connection with the drawings which form a part thereof, and which disclose more or less diagrammatically a preferred form of the invention.

In said drawings:

Fig. 1 is a plan view of the complete truck, a portion of one of the side frames and part of the transom and bolster being shown in section on the planes indicated by the broken line 1—1 of Fig. 3;

Fig. 2 is a fragmentary partly sectional side elevation thereof, on an enlarged scale, the section being made on the plane indicated by the line 2—2 of Fig. 1; and Fig. 3 is a vertical section on the same scale as Fig. 2, showing one-half of the transom and bolster and associated parts, the section being made on the plane indicated by the line 3—3 of Fig. 1.

In all the figures, corresponding elements are indicated by similar reference characters.

The truck comprises the built-up hollow side frames 2 connected at their ends by the transverse braces 3 and at their mid-points by the transom 5. An axle 1 at each end of the truck carries the wheels 4 and within the transom 5 is housed the bolster 6. The transverse braces 3 may be mounted in suitable bores 15 in the enlarged ends 16 of brackets 7 secured to the side frames 2, with a yieldable bushing 17 of rubber or the like in each such bore, to afford a slight degree of flexibility. To provide means for mounting the braces in the lugs 16, the braces may have reduced threaded ends 18 over which are passed washers 19, and upon which are threaded nuts 20, with suitable lock washers or the like thereunder. Preferably shoulders or collars such as 21 will be formed on the braces 3 to serve as abutments.

At each end of each frame 2 is secured a bearing 22 having therein a bushing 23 receiving an end of a corresponding tubular member 14, and permitting rotation of said tubular member therein. The other end of each tubular member 14 is preferably rigidly secured to a fitting or housing 24 which is also rigidly secured to the side frame 2 near the mid-point thereof, so as to hold the inner end of each tube 14 securely against rotation or other movement with respect to the side frame. Each pair of tubes 14 attached to the same side frame 2 will be in alinement with one another, and will house a torsion rod 10, extending substantially from end to end of the side frame.

In order to attach the ends of the torsion rod to the adjacent ends of the tubes, multiple, preferably spiral, keyways may be formed on both members and interengaged forcibly, such keyways being shown at 25 on the rod, and at 26 within the tube. In addition each end of the rod 10 may be threaded as shown at 27 to receive a nut 28. It will be understood that the nuts 28 in connection with the spiral or other keyways 25 and 26 will provide a secure connection between each tube 14 and the corresponding end of the rod 10.

At approximately the center point of the rod 10, a lever arm 11 is secured, likewise by means of a plurality of keys and keyways formed in the outside of the rod 10 at 29 and within the end of the said lever 11 as shown at 30, which will interengage to afford a rigid non-slipping connection between the rod 10 and the lever 11.

The housing 24 may have enlarged portions as shown at 31, to receive anti-friction means such as the ball bearings 32, for mounting the rod therein, so that the center of the rod may turn freely with respect to said fittings 24.

The bolster 6 may have a casting 33 secured to its bottom near each end by any suitable means, such as the rivets 34. The casting 33 has lugs 35 at its outer end, apertured to receive a pin 36 received also in a corresponding bore in the lower end of the link 37, which is thus pivotally attached to said casting. At its upper end the link 37 has a further pin 38, passing through a suitable bore in the link and received in a notch or groove 39 in the inner end of the arm 11.

The weight of the bolster 6 and any structure supported thereby will thus be transmitted, through the casting 33 and link 37, to the inner end of the arm 11 and thence to the torsion rod 10, so that such stresses will be torsionally and resiliently supported by the rod 10 and the surrounding tubes, instead of by the conventional springs heretofore generally used to support bolsters.

A series of rubber elements, here shown as blocks or plates 13, is located preferably within each end of the bolster, each rubber slab being vulcanized between two metal plates on its opposite faces, so as to form a sandwich, said metal plates being then secured to one another to hold the successive sandwiches together. In the present case each rubber slab is shown as having one flat metal plate 40 on one side thereof, while on the other side there is a metal plate 41 which has edges bent into hook shape to receive the corresponding edges of the flat metal plate of the next succeeding sandwich, all the sandwiches thus being essentially alike for ease of manufacture. The innermost sandwich however may have a flat plate 42 at its inner end, which abuts against the cross member or partition 43 of the bolster.

The outermost sandwich may bear against a metal plate 44, against which abuts a preferably cylindrical or cup-shaped member 45, having its outer end convexly rounded as shown at 46, and bearing against the inner curved face 47 of the link 37. The rubber sandwiches thus provide a yieldable abutment at each end of the bolster, which will allow a slight degree of side motion or sway of said bolster. The cup 45 preferably is guided in a cylindrical guide 48, held to the bolster 6 by a suitable flange 49.

The inclined end plate 50 of the bolster may have a suitable opening 51 therein, to accommodate the lever arm 11, the link 37 and the end of the casting 33, as shown in Figs. 1 and 3. The top of the end of the bolster has a lateral extension built-up of the channels 52 and the plates 53 and 54, upon which is mounted the block 55 carrying the casting 56 that supports the roller 57, which bears under the body of the vehicle. At the center of the bolster may be mounted the center plate 8, which cooperates with the rollers 57 in supporting the said vehicle body.

In order to increase the strength of the bolster, additional flanged braces such as 58 may be provided, and the partitions such as 43 and 58 may be further stiffened by braces 59 at right angles thereto, the parts being secured rigidly to one another, preferably by welding wherever feasible, so as to provide a relatively light but very strong structure.

In order to provide the truck with a certain amount of yield, rubber members 60 may be located about the ends of the axles, as shown diagrammatically in Fig. 1. This permits a slight degree of "give," due to the compressibility of the rubber itself. Such yield of course is not comparable to that of the springs ordinarily placed in pedestals, but nevertheless is adequate to prevent binding from slight mis-alinements or twists occurring in service, and a similar purpose is served by the rubber inserts 17 in relation to the cross braces 3. The resilient mounting of the bolster, however, affords the equivalent of the conventional steel or other springs heretofore commonly used in trucks.

The operation of the device will be obvious from the structure but may be summarized briefly as follows:

When a load comes on the bolster, such load will be transmitted to the torsion rods 10 through the arms 11 and will thus twist the rods about their central axes, while at the same time also twisting the torsion tubes 14 surrounding the said rods. The preferred design will be such that the torsional strength of the tubes is the same or substantially the same as that of the rods enclosed therein, so that they will share equally in supporting the load, thus giving the same effect as though each rod were twice as long as it actually is, since the tube surrounding the rod virtually forms a continuation thereof, and assumes its due share of the torsional load.

Up-and-down motion of the bolster is thus converted into torsional stress in the rods and tubes. Any side sway of the bolster is taken up by the compression and expansion of the rubber slabs 13, thus providing a very compact suspension for the bolster which provides for vertical and transverse resilient yield of the same, adequate for its purpose.

While the present invention has been described herein in connection with a certain embodiment thereof it is obvious that this embodiment is not the only form in which the invention may be constructed but that it is merely a disclosure of a certain type of structure which at present is believed to be the preferred form.

Inasmuch as many changes, additions, and omissions may be made with respect to the structures disclosed herein, attention is specifically directed to the fact that the invention is not to be considered as limited to the precise structures herein disclosed, but is defined solely by the following claims.

I claim:

1. In a truck having a frame and a bolster, means for resiliently mounting said frame and said bolster with respect to one another, comprising a torsion spring extending along one of the longitudinal sides of the frame, said spring consisting of an outer element in the form of a tube and an inner element rotatably accommodated within the bore of the tube, said elements being rigidly secured to one another at one pair of ends, means connecting the remaining end of the one of said elements to the frame and lever means connecting the remaining end of the other element to the bolster.

2. In a truck having a frame and a bolster, means for resiliently mounting said frame and said bolster with respect to one another, comprising a torsion spring extending along one of the longitudinal sides of the frame, said spring consisting of an outer element in the form of a tube and an inner element rotatably accommodated within the bore of the tube, said elements being rigidly secured to one another at one pair of ends, means rigidly connecting the remaining end of the one of said elements to the frame, a lever secured to the remaining end of the other element, and a link pivotally connecting the outer end of the lever to the bolster.

3. In a truck having a frame and a bolster adapted for limited vertical and transverse movement, means for resiliently mounting said frame and said bolster with respect to one another, comprising a torsion spring extending along one of the longitudinal sides of the frame, means connecting the respective ends of said spring to the frame and the bolster, the means connecting the spring to the bolster comprising an arm rigidly secured to the spring and hingedly connected to the bolster, and a compression spring between an abutment on the bolster and the hinged connecting means, to afford resilient resistance to sidewise motion of the bolster.

4. In a truck having a frame and a bolster, means for resiliently mounting said frame and said bolster with respect to one another, comprising a metallic torsion spring extending along one of the longitudinal sides of the frame, means connecting the respective ends of said spring to the frame and to the bolster, the means connecting the spring to the bolster comprising an arm rigidly secured to the spring and hingedly connected through a link to the bolster, and a compression spring, comprising a slab of rubber, interposed between an abutment on the bolster and the said link, to afford resilient resistance to sidewise motion of the bolster.

5. In a truck having a frame and a bolster, means for resiliently mounting said frame and said bolster with respect to one another, comprising a torsion spring extending along one of the longitudinal sides of the frame, said spring consisting of an outer element in the form of a tube and an inner element rotatably accommodated within the bore of the tube, said elements being rigidly secured to one another at one pair of ends, said elements having substantially equal torsional strengths, means rigidly connecting the remaining end of the one of said elements to the frame, a lever adjustably secured to the remaining end of the other element, to permit controlling the initial torsional resistance, and a link pivotally connecting the outer end of the lever to the bolster.

6. In a truck having a frame and a bolster, means for resiliently mounting said frame and said bolster with respect to each other, comprising a torsion spring extending along one of the longitudinal sides of the frame, said spring consisting of outer elements in the form of tubes extending in opposite directions from the region adjacent the bolster to points adjacent the ends of the side frame and an inner element rotatably accommodated within the bores of the tubes and extending continuously between the remote ends of the tubes and rigidly secured thereto at said ends, the ends of the tubes adjacent the bolster being rigidly secured to the frame in spaced-apart relation, the central portion of the inner member between said spaced-apart ends of the outer tubes having an arm rigidly secured thereto and hingedly connected to the bolster.

7. In a truck having side frame elements and a bolster, means for resiliently supporting said bolster on said frame elements, said means comprising a torsion spring extending in longitudinal direction along one side of one of the side frame elements, one point of said torsion spring being rigidly fastened to the last-named side frame element, another point of said torsion spring being rigidly connected to a lever, said lever extending through an opening in said side frame element and being connected on the other side of said element to said bolster.

8. In a vehicle having side frame elements, a torsion spring arranged in longitudinal direction on the outside of one of said side frame elements, one point of said spring being rigidly connected to said side frame element and another point being rigidly connected to a lever, said lever extending inwardly through an opening of said side frame element and having its inwardly extended end adapted to be connected to another structure which is vertically movable relative to said side frame elements.

9. In a truck having side frame elements and a bolster, means for resiliently supporting said bolster on said frame elements, said means comprising a torsion spring extending in longitudinal direction along one side of one of the side frame elements, one point of said torsion spring being rigidly fastened to the last-named side frame element, another point of said torsion spring being rigidly connected to a lever, said lever extending into an opening in said side frame element and engaging said bolster.

10. In a truck, such as a railway truck, the combination with a side frame having provision for mounting the truck axles and wheels, and also provided at its outerside with lateral bearing and anchorage brackets at a substantial distance apart, and a load-sustaining bolster associated with said side frame and movable up and down relative thereto; of a longitudinal elastic torsion member extending along the outside of said side frame in its said bearing and anchorage brackets, and anchored by the latter against turning, and a crank attached to said torsion member extending inward therefrom into position for engaging the bolster; and anchorage means for said torsion member attached to the side frame at a substantial distance from said crank, whereby the load on the bolster is elastically transmitted to the side frame through said torsion member.

11. In a truck, such as a railway truck, the combination with a side frame having provision for mounting the truck axles and wheels, and also having a window opening, and a load-sustaining bolster movable up and down relative to said side frame in the region of said window opening, of a crank having trunnions, and itself extending into said window opening to engage the bolster to sustain the same; a longitudinal elastic torsion member extending along the outside of said side frame through said crank and its trunnions, and anti-turningly engaged in said crank; supporting brackets for said crank trunnions on the outer side of said side frame, at either side of its said window opening, having bearing seats, and bearings for said trunnions seated in said bearing seats, and anchorage means for said torsional member attached to the side frame at a substantial distance from said crank, whereby the load on the bolster is elastically transmitted to the side frame through said torsion member.

JOSEPH LEDWINKA.